US011428335B2

(12) United States Patent
Caya et al.

(10) Patent No.: US 11,428,335 B2
(45) Date of Patent: Aug. 30, 2022

(54) PRESSURE VALVE FOR FERMENTER

(71) Applicant: Spike Brewing LLC, Milwaukee, WI (US)

(72) Inventors: Benjamin Caya, Milwaukee, WI (US); Adam J. Hellman, Glendale, WI (US); Ryan Scott Dauss, Milwaukee, WI (US)

(73) Assignee: Spike Brewing LLC, Milwaukee, WI (US)

( * ) Notice: Subject to any disclaimer, the term of this patent is extended or adjusted under 35 U.S.C. 154(b) by 0 days.

(21) Appl. No.: 17/346,473

(22) Filed: Jun. 14, 2021

(65) Prior Publication Data

US 2021/0388911 A1 Dec. 16, 2021

Related U.S. Application Data

(60) Provisional application No. 63/039,072, filed on Jun. 15, 2020, provisional application No. 63/055,570, filed on Jul. 23, 2020.

(51) Int. Cl.
*F16K 17/04* (2006.01)
*F16K 17/06* (2006.01)
(Continued)

(52) U.S. Cl.
CPC ........ *F16K 17/044* (2013.01); *F16K 17/0486* (2013.01); *F16K 17/06* (2013.01); *F16K 17/196* (2013.01); *G05D 16/16* (2013.01)

(58) Field of Classification Search
CPC .... F16K 17/044; F16K 17/0486; F16K 17/06; F16K 17/196; Y10T 137/7775
(Continued)

(56) References Cited

U.S. PATENT DOCUMENTS 2,011,837 A * 8/1935 Whitted .................... F16F 9/22
188/320
2,045,780 A * 6/1936 Jett ....................... F16K 17/196
137/493.4
(Continued)

OTHER PUBLICATIONS

Blichmann Engineering, "Spunding Valve Assembly, Operation, & Maitenance," Spunding—Valve VI, © Blichmann Engineering, LLC, publicly available prior to Jun. 15, 2020 (5 pages).

*Primary Examiner* — William M McCalister
(74) *Attorney, Agent, or Firm* — Michael Best & Friedrich LLP (57) ABSTRACT

A pressure valve is configured to be selectively coupled to a vessel and includes a housing including a vent aperture configured to provide fluid communication between an internal cavity of the housing and ambient air surrounding the pressure valve, an accessory aperture configured to couple an accessory to the housing, and a seal seat positioned within the internal cavity fluidly between the vent aperture and the accessory aperture. The pressure valve includes a pressure control assembly including a seal configured to break a sealing engagement with the seal seat to provide fluid communication between the vessel and the vent aperture in response to a desired positive pressure being reached within the vessel. The seal is configured to break the sealing engagement with the seal seat to provide fluid communication between the vessel and the vent aperture in response to an operator moving an actuator of the pressure control assembly.

20 Claims, 11 Drawing Sheets

(51) Int. Cl.
*F16K 17/196* (2006.01)
*G05D 16/16* (2006.01)

(58) Field of Classification Search
USPC .................................................. 137/493.4
See application file for complete search history.

(56) References Cited

U.S. PATENT DOCUMENTS

| | | | | | |
|---|---|---|---|---|---|
| 2,299,367 | A * | 10/1942 | Webb | ................... | F16K 17/196 |
| | | | | | 137/493.4 |
| 2,393,589 | A * | 1/1946 | Compton | ................ | F16K 17/18 |
| | | | | | 137/493.4 |
| 2,591,562 | A * | 4/1952 | Levell | ................. | F01P 11/0247 |
| | | | | | 220/231 |
| 2,690,757 | A * | 10/1954 | Orchowski | ............ | F16K 15/20 |
| | | | | | 137/226 |
| 2,758,664 | A * | 8/1956 | Koenig | .................. | F16K 31/22 |
| | | | | | 137/433 |
| 3,086,677 | A * | 4/1963 | Konchan | ............. | F01P 11/0247 |
| | | | | | 220/203.07 |
| 3,108,610 | A * | 10/1963 | De See | ................. | F16K 17/196 |
| | | | | | 137/493 |
| 3,554,214 | A * | 1/1971 | Stenlund | ................ | F15B 13/02 |
| | | | | | 137/270 |
| 3,699,999 | A * | 10/1972 | Dunkelis | ............... | F16K 31/084 |
| | | | | | 137/493.4 |
| 4,153,073 | A * | 5/1979 | Deters | ................... | B67D 7/048 |
| | | | | | 137/493.4 |
| 4,883,107 | A * | 11/1989 | Keys | ....................... | B60C 29/06 |
| | | | | | 152/431 |
| 5,226,442 | A * | 7/1993 | Taylor | .................... | F16K 17/19 |
| | | | | | 137/493.4 |
| 7,021,326 | B2 * | 4/2006 | Rogier | ..................... | B63C 9/24 |
| | | | | | 137/226 |
| 7,171,977 | B2 * | 2/2007 | Wass | ..................... | F16K 15/207 |
| | | | | | 137/226 |
| 7,624,752 | B2 * | 12/2009 | Huang | ................. | F16K 15/207 |
| | | | | | 137/226 |
| 2003/0205278 | A1 * | 11/2003 | Zenker | ................... | F15B 13/10 |
| | | | | | 137/596.2 |
| 2011/0056938 | A1 * | 3/2011 | Petrarca | ................ | B65D 90/34 |
| | | | | | 220/203.01 |

\* cited by examiner

PRESSURE VALVE FOR FERMENTER

CROSS REFERENCE TO RELATED APPLICATIONS

This application claims priority to U.S. Provisional Patent Application No. 63/039,072, which was filed on Jun. 15, 2020, and U.S. Provisional Patent Application No. 63/055, 570, which was filed on Jul. 23, 2020. The entire contents of both of which are incorporated herein by reference.

FIELD OF THE DISCLOSURE

The present disclosure relates to a pressure valve, and more particularly to a pressure valve configured to be selectively coupled to a fermenter and operable to regulate the pressure within the fermenter.

SUMMARY

In one aspect, a pressure valve is configured to be selectively coupled to a vessel. The pressure valve includes a housing defining an internal cavity. The housing includes a vent aperture configured to provide fluid communication between the internal cavity and ambient air surrounding the pressure valve, an accessory aperture configured to couple an accessory to the housing, and a seal seat positioned within the internal cavity fluidly between the vent aperture and the accessory aperture. The pressure valve includes a pressure control assembly coupled to the housing. The pressure control assembly includes an actuator and a shaft coupled to the actuator. The shaft includes an end portion. The pressure control assembly includes a seal selectively engageable with the seal seat of the housing. The seal is also selectively engageable with the end portion of the shaft. The seal is configured to break a sealing engagement with the seal seat to provide fluid communication between the vessel and the vent aperture in response to a desired positive pressure being reached within the vessel. The seal is configured to break the sealing engagement with the seal seat to provide fluid communication between the vessel and the vent aperture in response to an operator moving the actuator. The end portion of the shaft is configured to break a sealing engagement with the seal to provide fluid communication between the vessel and the vent aperture in response to a negative pressure being reached within the vessel. The end portion of the shaft is configured to break the sealing engagement with the seal to provide fluid communication between the vessel and the vent aperture in response to the operator moving the end portion of the shaft relative to the seal.

In another aspect, a pressure valve is configured to be selectively coupled to a vessel. The pressure valve includes a housing defining an internal cavity. The housing includes a vent aperture configured to provide fluid communication between the internal cavity and ambient air surrounding the pressure valve, an accessory aperture configured to couple an accessory to the housing, and a seal seat positioned within the internal cavity fluidly between the vent aperture and the accessory aperture. The pressure valve includes a pressure control assembly coupled to the housing. The pressure control assembly includes a seal configured to break a sealing engagement with the seal seat to provide fluid communication between the vessel and the vent aperture in response to a desired positive pressure being reached within the vessel. The seal is configured to break the sealing engagement with the seal seat to provide fluid communication between the vessel and the vent aperture in response to an operator moving an actuator of the pressure control assembly.

In yet another aspect, a pressure valve is configured to be selectively coupled to a vessel. The pressure valve includes a housing defining an internal cavity. The housing includes a vent aperture configured to provide fluid communication between the internal cavity and ambient air surrounding the pressure valve and a seal seat positioned within the internal cavity such that the seal seat is configured to be fluidly between the vent aperture and the vessel. The pressure valve includes a pressure control assembly coupled to the housing. The pressure control assembly includes a seal selectively engageable with the seal seat. The pressure control assembly includes a shaft having end portion selectively engageable with the seal. The end portion of the shaft is configured to break a sealing engagement with the seal to provide fluid communication between the vessel and the vent aperture in response to a negative pressure being reached within the vessel. The end portion of the shaft is configured to break the sealing engagement with the seal to provide fluid communication between the vessel and the vent aperture in response to the operator moving the shaft relative to the housing.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
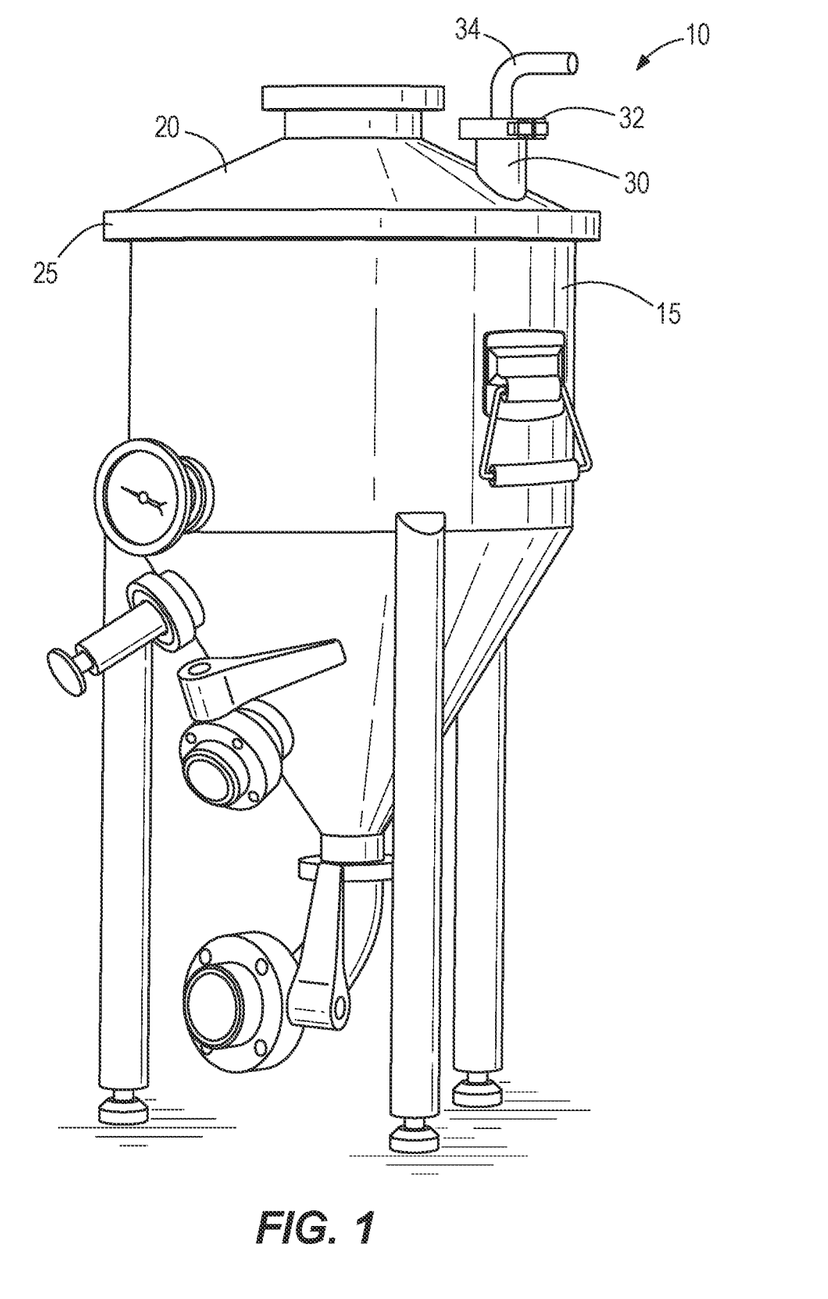
FIG. 1 is a perspective view of a fermenter including a body and a lid coupled to the body.

FIG. 1 illustrates a vessel 10 (e.g., a conical fermenter) including a body 15, a lid 20 coupled to a top of the body 15, and a locking assembly 25 that selectively fastens the lid 20 to the body 15. While the application illustrates a fermenter, which is a vessel that contains material undergoing fermentation, in other embodiments the vessel can be any suitable container or receptacle that can hold a material under pressure. For ease of discussion, the disclosure will refer to the vessel 10 as a fermenter 10. The illustrated locking assembly 25 is a band clamp that can include a gasket (not shown) to facilitate an airtight seal between the lid 20 and the body 15. The lid 20 includes a port 30 that defines an opening to fluidly connect an interior of the body 15 to a device coupled to the port 30. In other embodiments, the port 30 can be coupled to the body 15 of the fermenter 10.

Figure 2:
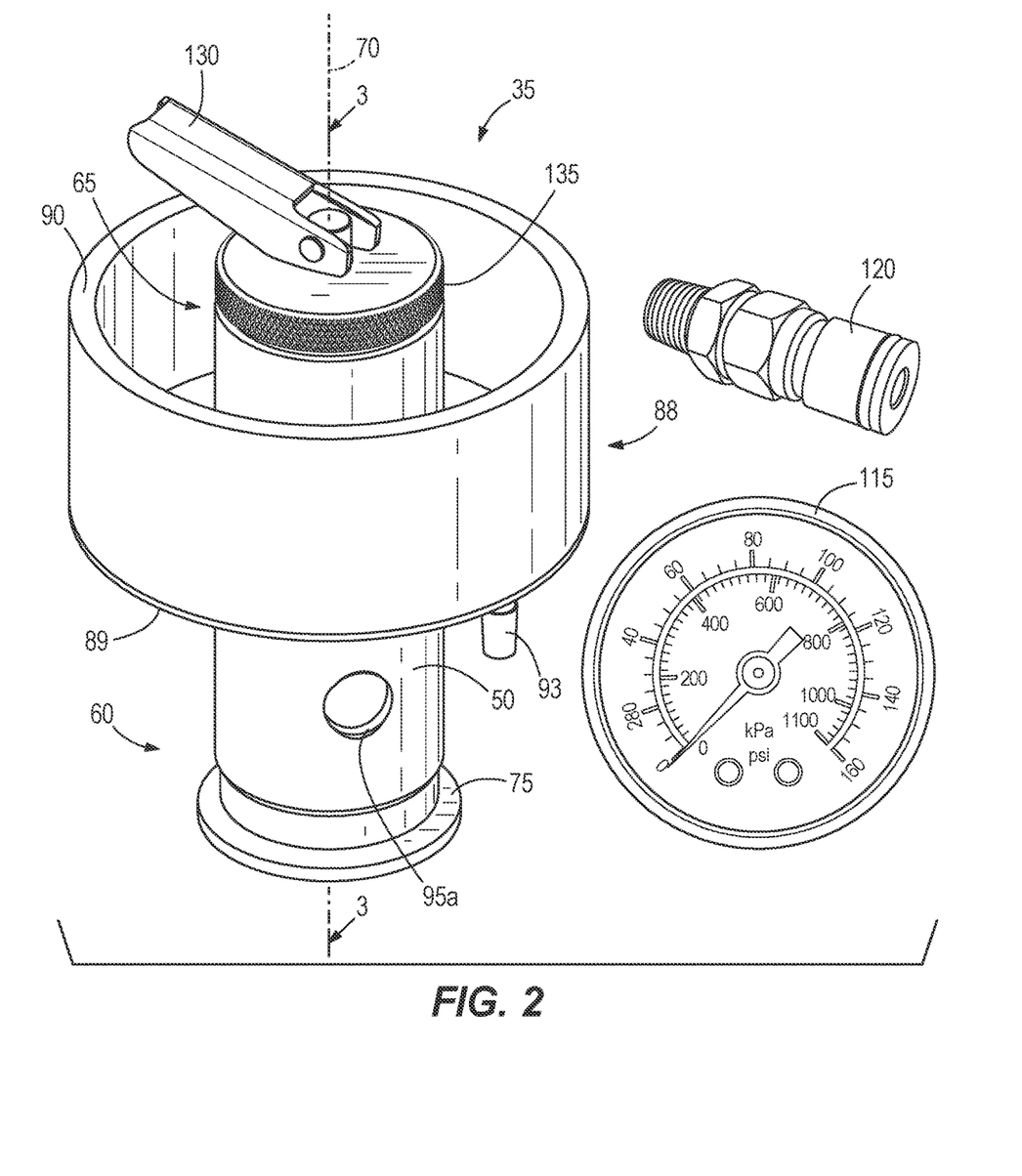
FIG. 2 is a perspective view of a pressure valve according to an embodiment of the disclosure selectively coupled to the lid of the fermenter.
Figure 3:
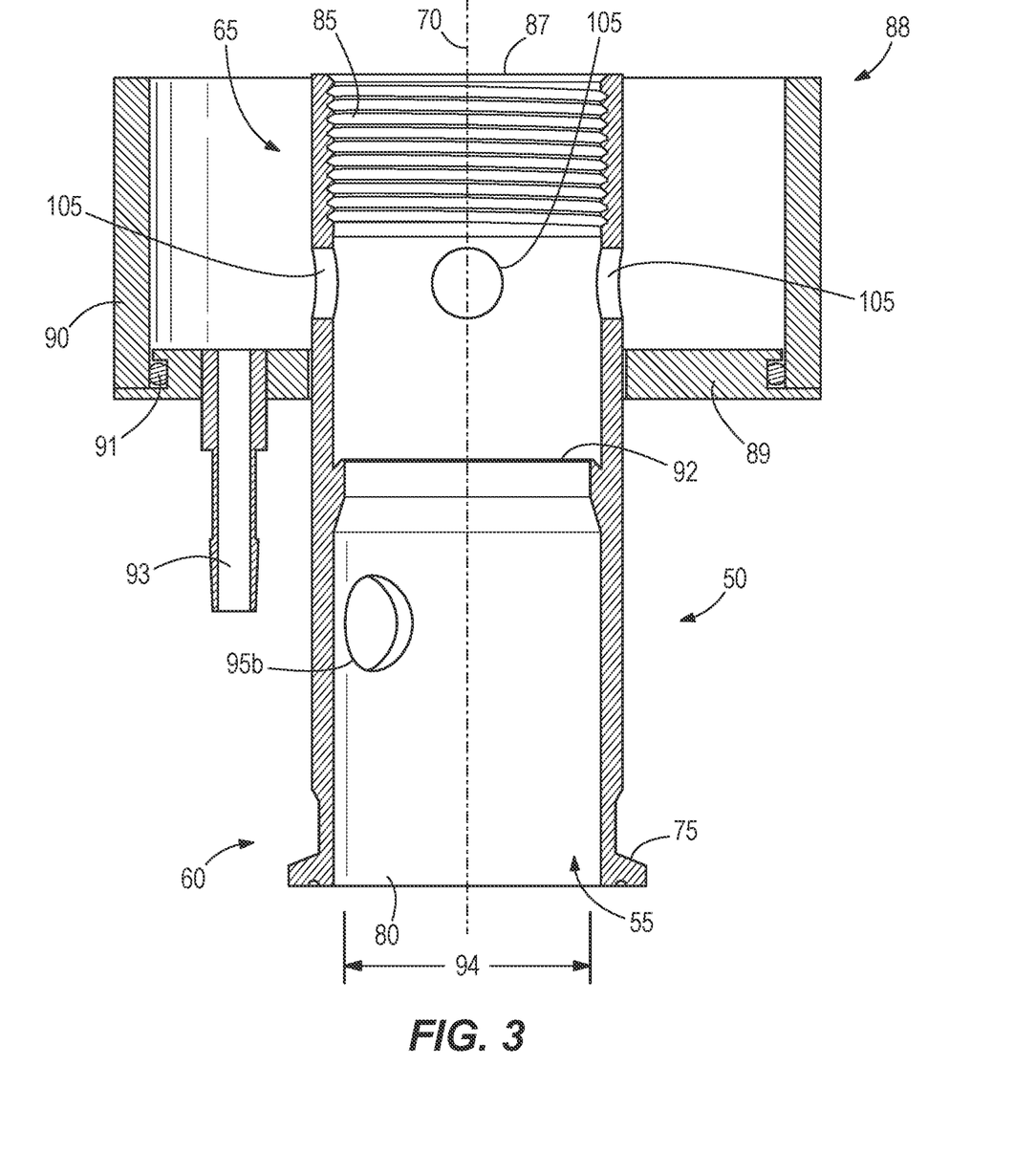
FIG. 3 is a cross sectional view of a housing of the pressure valve of FIG. 2.

A device is configured to be selectively secured to the port 30 by a clamp 32 (e.g., a tri-clamp, a band clamp, etc.). As illustrated in FIG. 1, the device can be a tube fitting 34. In other embodiments, other devices are configured to be coupled to the port 30 as an attachment, such as a pressure valve 35. With reference now to FIGS. 2 and 3, the pressure valve 35 includes a hollow housing 50 defining an internal cavity 55 (shown in FIG. 3). The housing 50 includes a bottom portion 60 opposite a top portion 65, and a longitudinal axis 70 that extends between the bottom and top portions 60, 65. The bottom portion 60 includes a flange 75 that defines a bottom opening 80 of the internal cavity 55 (shown in FIG. 3). With reference to FIG. 3, the top portion 65 includes a plurality of internal threads 85 that define a top opening 87 of the internal cavity 55. A gasket (e.g., a rubber O-ring, etc.) can be positioned between the flange 75 and the port 30 (shown in FIG. 1) to provide an airtight seal between the flange 75 and the port 30. The clamp 32 (shown in FIG. 1) is selectively engageable with the flange 75 to fasten the pressure valve 35 to the port 30.

With continued reference to FIGS. 2 and 3, the pressure valve 35 includes an open-end container 88 coupled to an outer surface of the housing 50. The open-end container 88 is configured to hold a liquid (e.g., a distilled liquor, a sterile liquid, an inert liquid, etc.), which is discussed in more detail below. In particular, the container 88 includes a base 89 coupled to the housing 50, a cylindrical ring 90 (e.g., a cylindrical sidewall) coupled to the base 89, and an O-ring 91 positioned between the base 89 and the cylindrical ring 90 to provide a liquid-tight seal therebetween. In the illustrated embodiment, the base 89 is fixed relative to the housing 50, and the cylindrical ring 90 is selectively coupled to and removable from the base 89. In other embodiments, the base 89 and the cylindrical ring 90 can be manufactured as a single component such that the O-ring 91 can be omitted and/or the base 89 can be selectively coupled to and removable from the housing 50. The cylindrical ring 90 can be opaque, semi-transparent, or transparent. In addition, the open-end container 88 also includes an outlet 93 coupled to the base 89 (best shown in FIG. 3). In the illustrated embodiment, the outlet 93 is a port that is selectively coupled to a valve (not shown) that allows the liquid within the open-end container 88 to be drained from the open-end container 88. In other embodiments, the outlet 93 can be the valve that allows the liquid to be drained from the open-end container 88. In further embodiments, the container 88 can be omitted from the pressure valve 35.

With specific reference to FIG. 3, a ledge 92 (e.g., a seal seat) of the housing 50 is positioned within the internal cavity 55 and protrudes radially inward from an inner surface of the housing 50 toward the longitudinal axis 70. The internal cavity 55 includes a diameter 94 defined by an inner edge of the ledge 92. The diameter 94 is between about one inch and about 1.5 inches. In the illustrated embodiment, the diameter 94 is about 1.25 inches.

With continued reference to FIGS. 2 and 3, the housing 50 also includes a plurality of accessory apertures 95a, 95b and a plurality of vent apertures 105. Both the accessory apertures 95a, 95b and the vent apertures 105 are formed through an outer surface of the housing 50 to be in communication with the internal cavity 55. The vent apertures 105 provide fluid communication between the internal cavity 55 and ambient air surrounding the pressure valve 35. The vent apertures 105 are positioned between the ledge 92 and the top opening 87 along the longitudinal axis 70. The accessory apertures 95a, 95b are positioned between the ledge 92 and the bottom opening 80 along the longitudinal axis 70. In other words, the ledge 92 is positioned between the accessory apertures 95a, 95b and the vent apertures 105 along the longitudinal axis 70. In addition, the base 89 of the container 88 is also positioned between the accessory apertures 95a, 95b and the vent apertures 105 along the longitudinal axis 70 such that the cylindrical ring 90 extends beyond the vent apertures 105 in a direction toward the top opening 87, and an opening of the outlet 93 is positioned below the vent apertures 105 in a direction toward the bottom opening 80. The accessory apertures 95a, 95b are threaded apertures that are configured to removably secure different accessories to the pressure valve 35. For example, a pressure gauge 115—operable to measure a pressure within the fermenter 10—can be threadably coupled to the first accessory aperture 95a, and a gas inlet post 120—operable to introduce a gas (e.g., carbon dioxide, etc.) into the fermenter 10—can be threadably coupled to the second accessory aperture 95b. Use of each accessory aperture 95a, 95b is optional. When not in use a plug (not shown) can be threadably coupled to each accessory aperture 95a, 95b to selectively seal the aperture 95a, 95b. In other embodiments, different accessories (e.g., a temperature gauge, etc.) can be coupled to the accessory apertures 95a, 95b. In further embodiments, the housing 50 can include one accessory aperture, at least one accessory aperture, or more than two accessory apertures. In yet further embodiments, the housing 50 can include one vent aperture 105.

Figure 4:
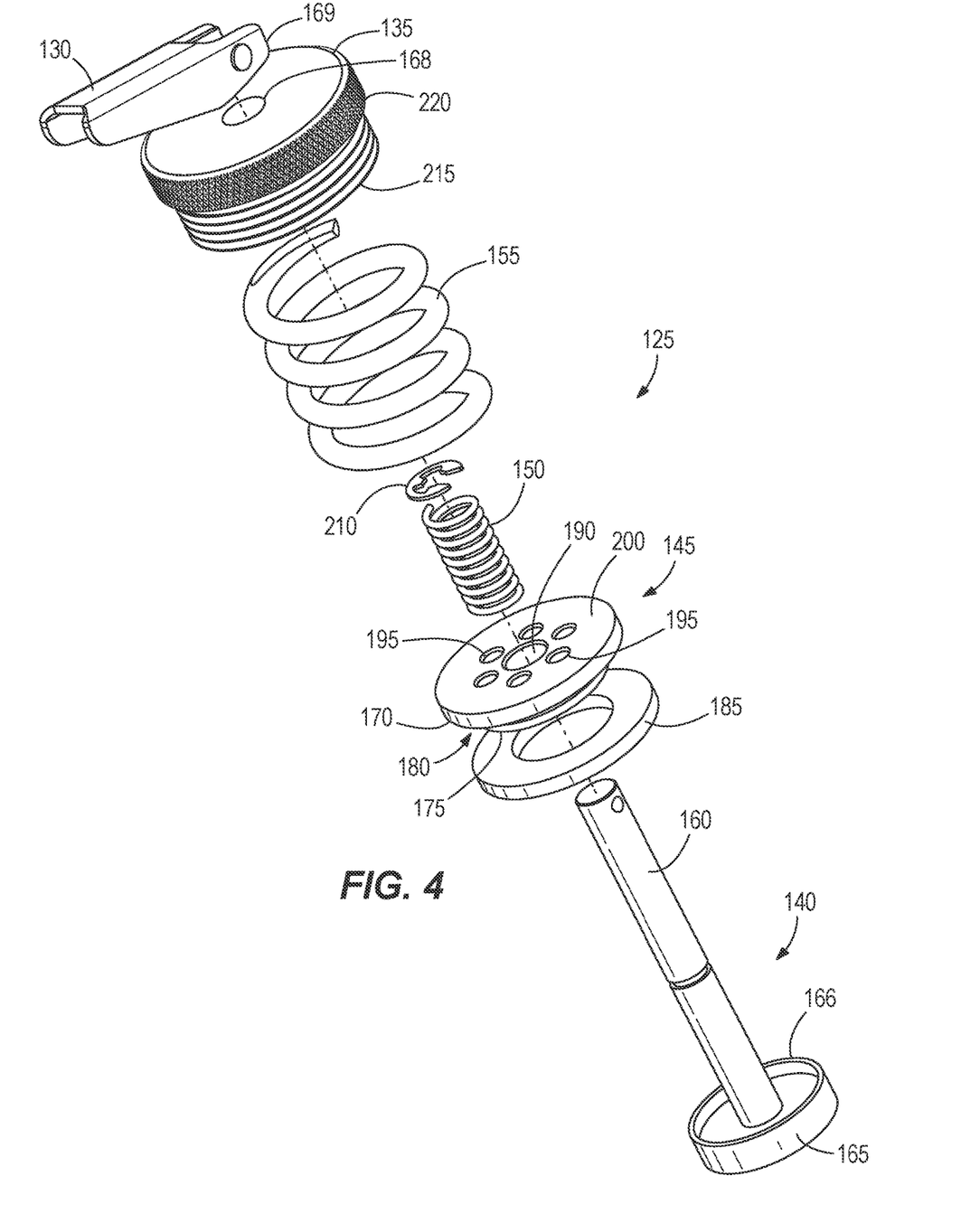
FIG. 4 is a first exploded view of a plunger assembly of the pressure valve of FIG. 2.
Figure 5:
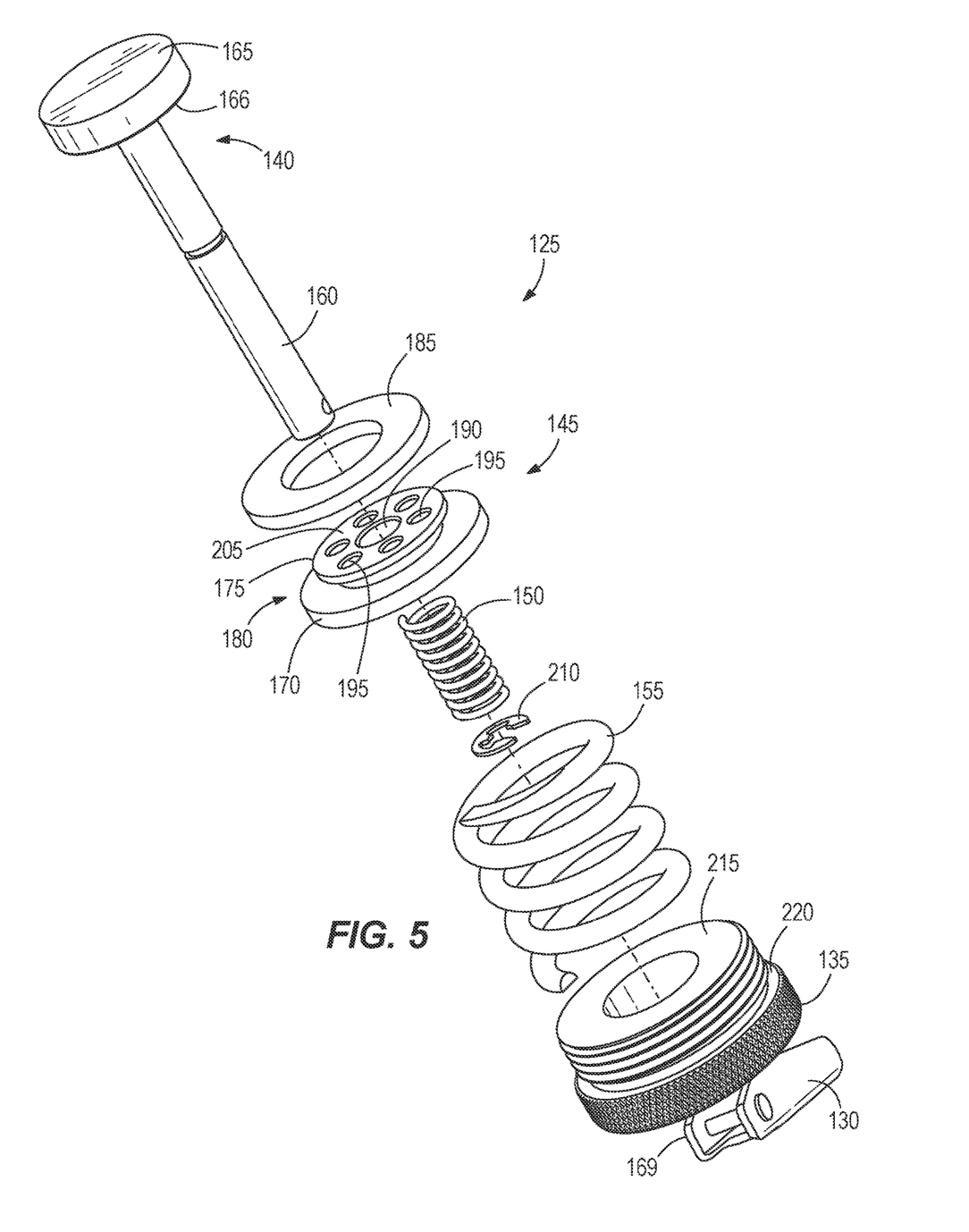
FIG. 5 is a second exploded view of the plunger assembly of the pressure valve of FIG. 2.

With reference to FIGS. 4 and 5, the pressure valve 35 includes a plunger assembly 125 (e.g., a pressure control assembly). The plunger assembly 125 includes an actuator 130 (e.g., a lever), a cover 135, a plunger 140, a disk 145, a first biasing member 150, and a second biasing member 155. The plunger 140 includes a shaft 160 and a bowl 165 (e.g., an end portion of the shaft 160) positioned at a bottom end (or first end) of the shaft 160. The bowl 165 includes an upper rim 166. A top end (or second end) of the shaft 160 extends through an opening 168 in the cover 135 such that the actuator 130 is coupled to the top end of the shaft 160. The illustrated actuator 130 includes a cam surface 169 positioned at an end of the actuator 130. In other embodiments, the cover 135 can include at least one vent aperture 105.

The illustrated disk 145 is coupled to the plunger 140 along the shaft 160. The disk 145 includes an upper portion 170, a lower portion 175, and a slot 180 positioned between the upper and lower portions 170, 175. A seal 185 (e.g., a rubber washer, a gasket, etc.) is partially received within the slot 180 to couple the seal 185 to the disk 145. In the illustrated embodiment, the upper portion 170 includes an outer diameter greater than an outer diameter of the lower portion 175. The lower portion 175 is sized to be received within the bowl 165 of the plunger 140 such that the upper rim 166 of the bowl 165 can be engageable with the seal 185 (see FIG. 6). In addition, the seal 185 includes an outer diameter greater than the diameter 94 of the internal cavity 55 such that the seal 185 is configured to be seated against the ledge 92 (see FIG. 6).

In addition, the illustrated disk 145 also includes a central aperture 190 that receives the shaft 160 and defines a plurality of vent passageways 195. The vent passageways 195 extend through an upper surface 200 of the upper portion 170 and a lower surface 205 of the lower portion 175. In other embodiments, the disk 145 can include at least one vent passageway 195. In further embodiments, the central aperture 190 can also function as a vent passageway such that the vent passageways 195 can be omitted from the disk 145.

The first biasing member 150 (e.g., a compression coil spring) is constrained between and engages the upper surface 200 of the disk 145 and a retainer 210 that is fixed to the shaft 160 of the plunger 140. The second biasing member 155 (e.g., a compression coil spring) is constrained between and engages the upper surface 200 of the disk 145 and a lower surface 215 of the cover 135. The second biasing member 155 has a diameter than is greater than the first biasing member 150 such that the first biasing member 150 can be received by (or positioned within) the second biasing member 155.

Figure 6:
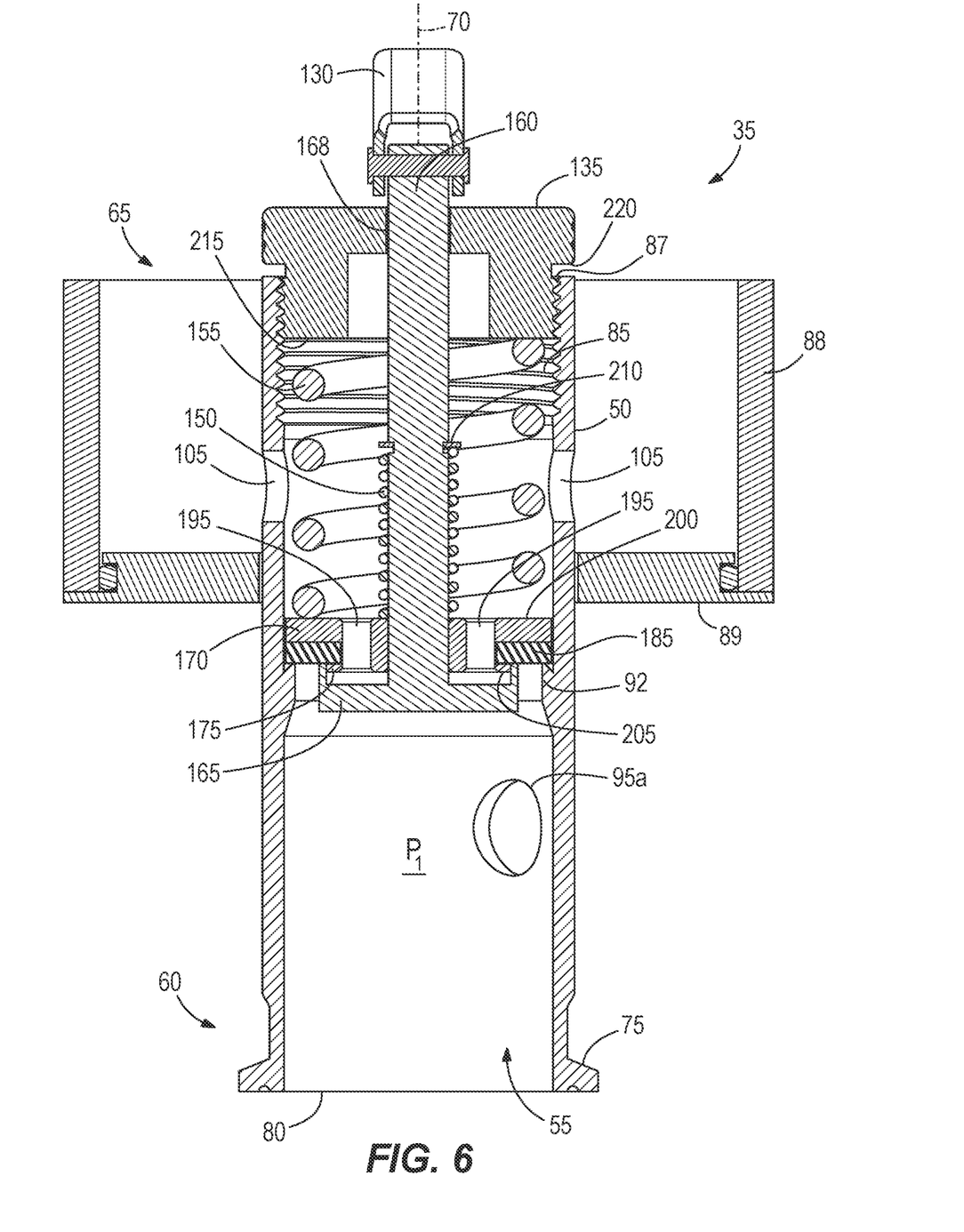
FIG. 6 is a cross sectional view of the pressure valve of FIG. 2, illustrating the pressure valve in a closed position.

During assembly of the pressure valve 35, the plunger assembly 125 is received through the top opening 87 of the housing 50 such that the cover 135 engages the internal threads 85 of the top portion 65. When the plunger assembly 125 is received within the housing 50, the shaft 160 is also parallel to (or concentric with) the longitudinal axis 70 of the housing 50. With reference to FIG. 6, the cover 135 is threadably rotated into the housing 50 such that the seal 185 engages the ledge 92 of the housing 50. In some embodiments, an outer surface of the cover 135 can include a gripping texture (e.g., surface knurling as shown in FIG. 2 or the like) or a gripping member (e.g., a rubber ring, etc.) to provide a gripping surface to rotate the cover 135 relative to the housing 50. With continued rotation of the cover 135, the second biasing member 155 is compressed to produce a biasing force acting on the seal 185 against the ledge 92. In other words, the second biasing member 155 biases the disk 145 and the seal 185 in a downward direction toward the bottom portion 60 of the housing 50. As a result, the second biasing member 155 biases the seal 185 into engagement with the ledge 92. Also, the ledge 92 restricts further movement of the disk 145 and the seal 185 toward the bottom portion 60 of the housing 50. When the plunger assembly 125 is fully received within the housing 50 (e.g., when a lip 220 of the cover 135 engages the top portion 65 of the housing 50), the second biasing member 155 provides a maximum biasing force acting on the seal 185 against the ledge 92. In some embodiments, the maximum biasing force of the second biasing member 155 is between about 11 pound-force and 27 pound-force. In the illustrated embodiment, the maximum biasing force of the second biasing member 155 is about 18 pound-force.

With continued reference to FIG. 6, the first biasing member 150 biases the upper rim 166 of the bowl 165 into engagement with the seal 185. In other words, the first biasing member 150 biases the plunger 140 in an upward direction toward the top portion 65 of the housing 50. The biasing force of the first biasing member 150 is less than the biasing force of the second biasing member 155.

During a fermentation process (e.g., brewing beer), a positive pressure may be desired within the fermenter 10. For example, it may be desirable to ferment while under pressure. As another example, it may be desirable to naturally carbonate a beer using carbon dioxide generated as a byproduct of fermentation. This process is also referred to as spunding, where material (e.g., yeast) is added to the fermenter 10 and biologically reacts with wort to produce alcohol and a gas (e.g., carbon dioxide). Maintaining the gas within the fermenter 10 creates a positive pressure environment within the fermenter 10 during the fermentation process. This gas can be absorbed by the wort (and finished beer) to naturally carbonate the beer. Additional gas (e.g., carbon dioxide) can also be introduced into the fermenter 10 through the gas inlet post 120, which is coupled to an external gas tank. The additional gas can be added during fermentation or after fermentation. The additional gas can be added to supplement spunding, or as an alternative to spunding to carbonate (e.g., force carbonate) the beer within the fermenter 10. The illustrated pressure valve 35 passively regulates the positive pressure within the fermenter 10. The positive pressure within the fermenter 10 acts on the bowl 165 and the seal 185 in the upward direction against the biasing force of the second biasing member 155. If a first positive pressure $P_1$ (FIG. 6) within the fermenter 10—as measured and observed on the pressure gauge 115 (shown in FIG. 2)—is below a predetermined target pressure, the second biasing member 155 provides an airtight seal between the plunger assembly 125 and the housing 50 (via engagement between the seal 185 and the ledge 92). This maintains the first positive pressure $P_1$ within the fermenter 10. In addition, the bowl 165 engages the seal 185 to also provide an airtight seal such that the positive pressure within the fermenter 10 does not escape through the vent passageways 195 of the disk 145.

Figure 7:
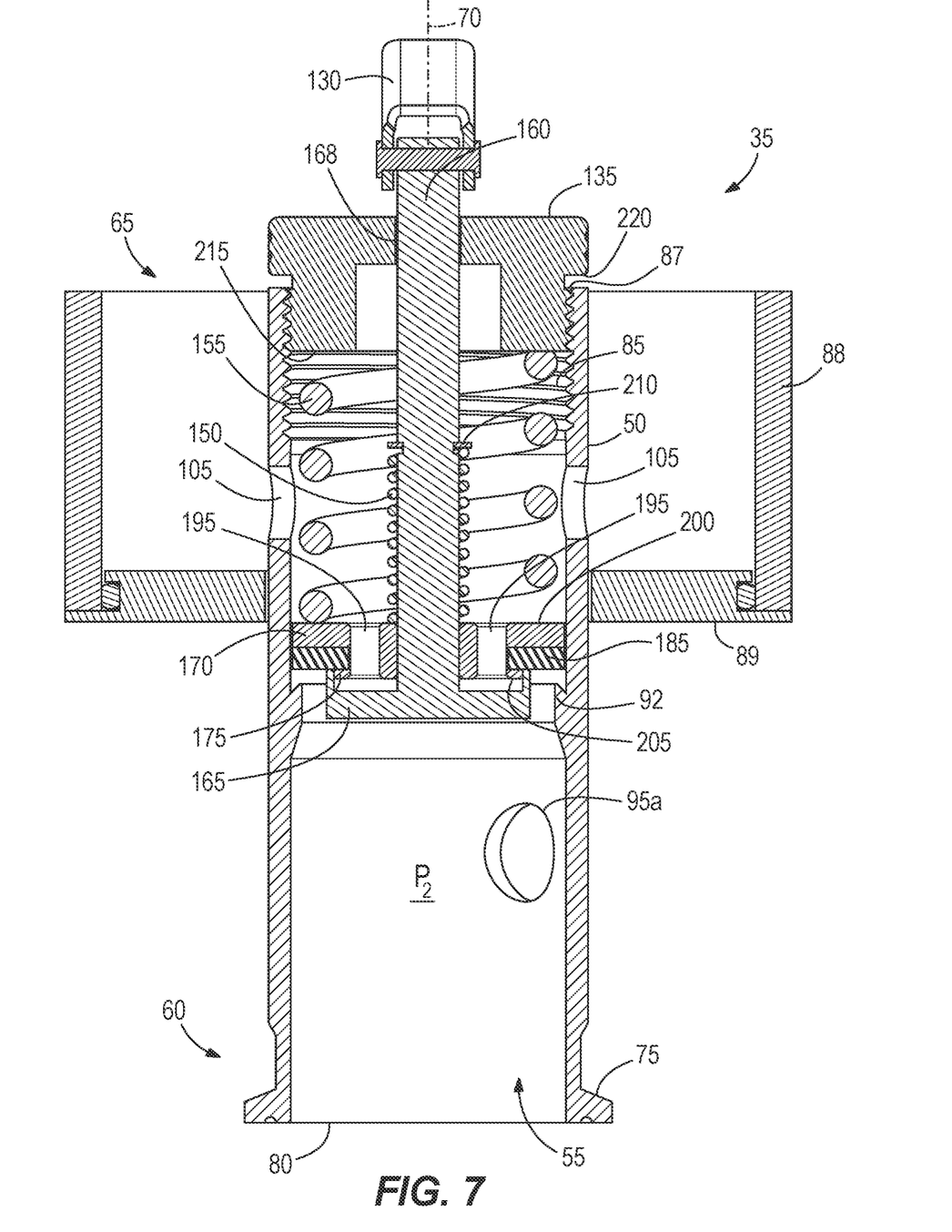
FIG. 7 is a cross sectional view of the pressure valve of FIG. 2, illustrating the pressure valve passively moveable into a pressure release position.
Figure 8:
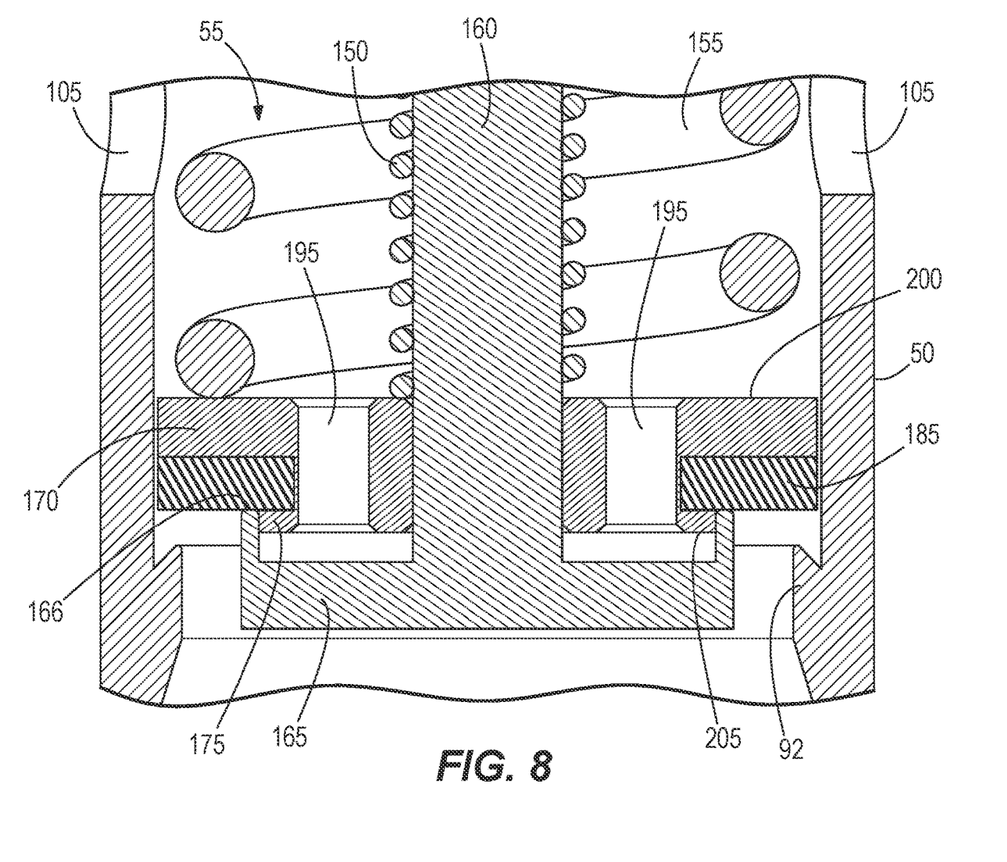
FIG. 8 is a detailed view of a portion of the pressure valve of FIG. 7.

The illustrated pressure valve 35 is operable to passively limit a maximum positive pressure within fermenter 10. As the first positive pressure $P_1$ (FIG. 6) increases and reaches a threshold pressure $P_2$ (FIG. 7), the pressure acts on the plunger assembly 125 and produces a force that overcomes the biasing force of the second biasing member 155. In turn, the plunger 140, the disk 145, and the seal 185 move upwards toward the cover 135 breaking the airtight seal between the ledge 92 and the seal 185. Accordingly, the pressure within the fermenter 10 is allowed to escape from the pressure valve 35 through the vent apertures 105 of the housing 50. In particular, the pressure within the fermenter 10 escapes through (e.g., bubbles out of) the inert liquid received within the container 88—the inert liquid is filled to a level within the container 88 as to cover the vent apertures 105. As a result, ambient air is blocked from entering the housing 50 to inhibit any air particles from moving past the seal 185 and into the fermenter 10. The bubbles in the inert liquid visually signifies the pressure valve 35 releasing pressure from the fermenter 10. Once enough positive pressure is released from the fermenter 10, the pressure decreases below the threshold pressure $P_2$ and second biasing member 155 reestablishes the airtight seal between the seal 185 and the ledge 92 (FIG. 6). In the illustrated embodiment, the threshold pressure $P_2$ is about 15 pounds per square inch (psi) above atmospheric pressure when the plunger assembly 125 is fully seated within the housing 50.

In other embodiments, the threshold pressure $P_2$, which is dependent upon the biasing force of the second biasing member 155 and the diameter 94 of the ledge 92, can be different than 15 psi.

The illustrated pressure valve 35 is also adjustable to decrease the maximum positive pressure within the fermenter 10 to a desired amount. By rotating the cover 135 in a loosening direction from the housing 50, the second biasing member 155 decompresses to decrease the biasing force acting to provide the airtight seal between the ledge 92 and the seal 185. Accordingly, by adjusting the cover 135, the positive pressure within the fermenter 10 can be changed by the pressure valve 35 to a desired amount (e.g., any pressure from 0 psi to 15 psi above atmospheric pressure). For example, to maintain the fermenter 10 at 5 psi, the cover 135 is rotated in the loosening direction until 5 psi is observed on the pressure gauge 115.

Figure 9:
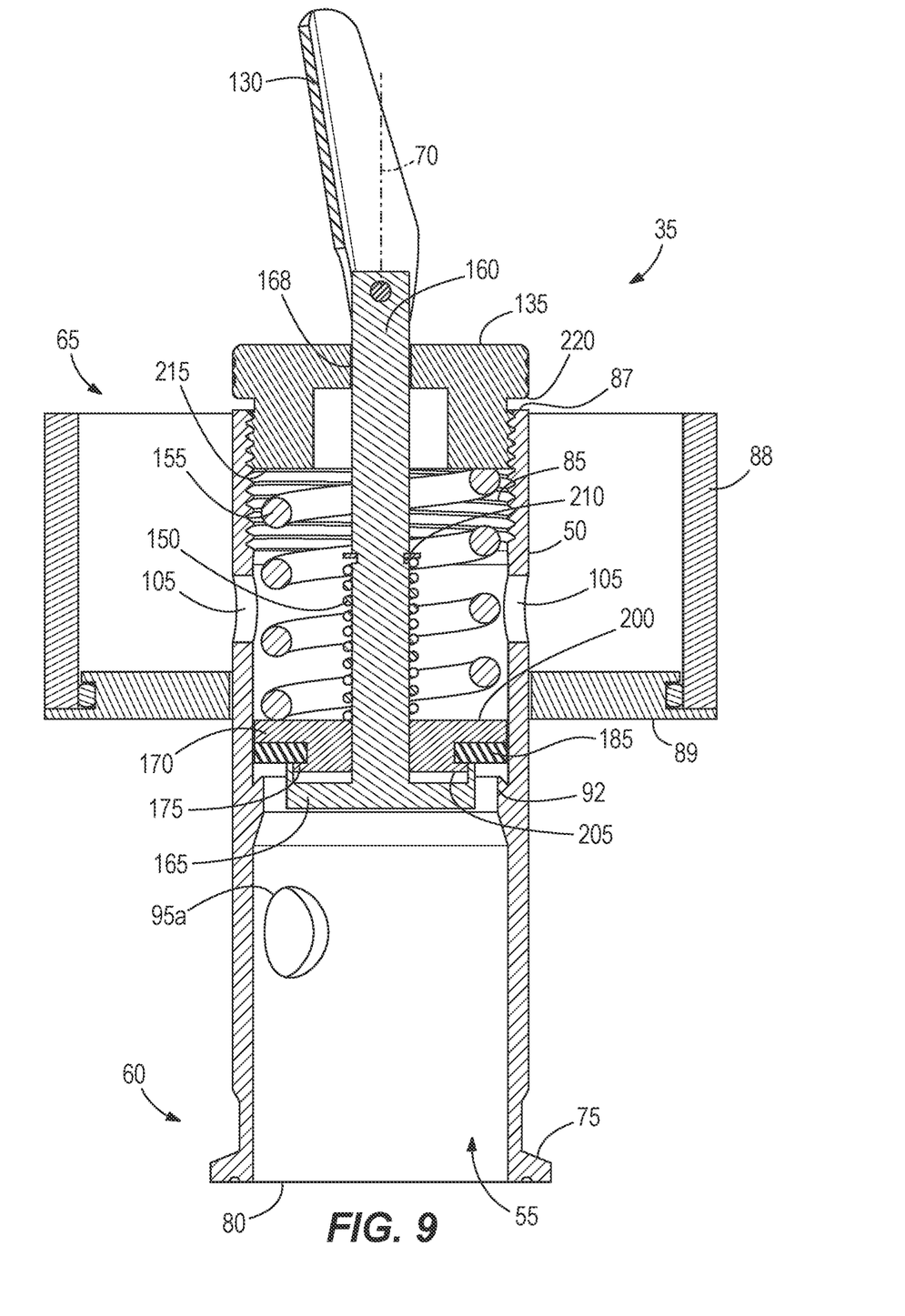
FIG. 9 is a cross sectional view of the pressure valve of FIG. 2, illustrating the pressure valve manually moveable into the pressure release position.

With reference to FIG. 9, the positive pressure within the fermenter 10 can be manually released by moving the actuator 130. By rotating the actuator 130 relative to the shaft 160 into the upright position shown in FIG. 9, the cam surface 169 of the actuator 130 engages a top surface of the cover 135 to move the plunger 140 upwardly. Such movement also moves the seal 185 and the disk 145 upwardly against the biasing force of the second biasing member 155 to break the airtight seal between the ledge 92 and the seal 185. Accordingly, the positive pressure within the fermenter 10 can be manually released through the pressure valve 35 (e.g., before the locking assembly 25 is loosened and the lid 20 is removed from the body 15). In addition, the actuator 130 in the upright position as shown in FIG. 9 provides a visual indication that the positive pressure within the fermenter 10 is being manually released.

Figure 10:
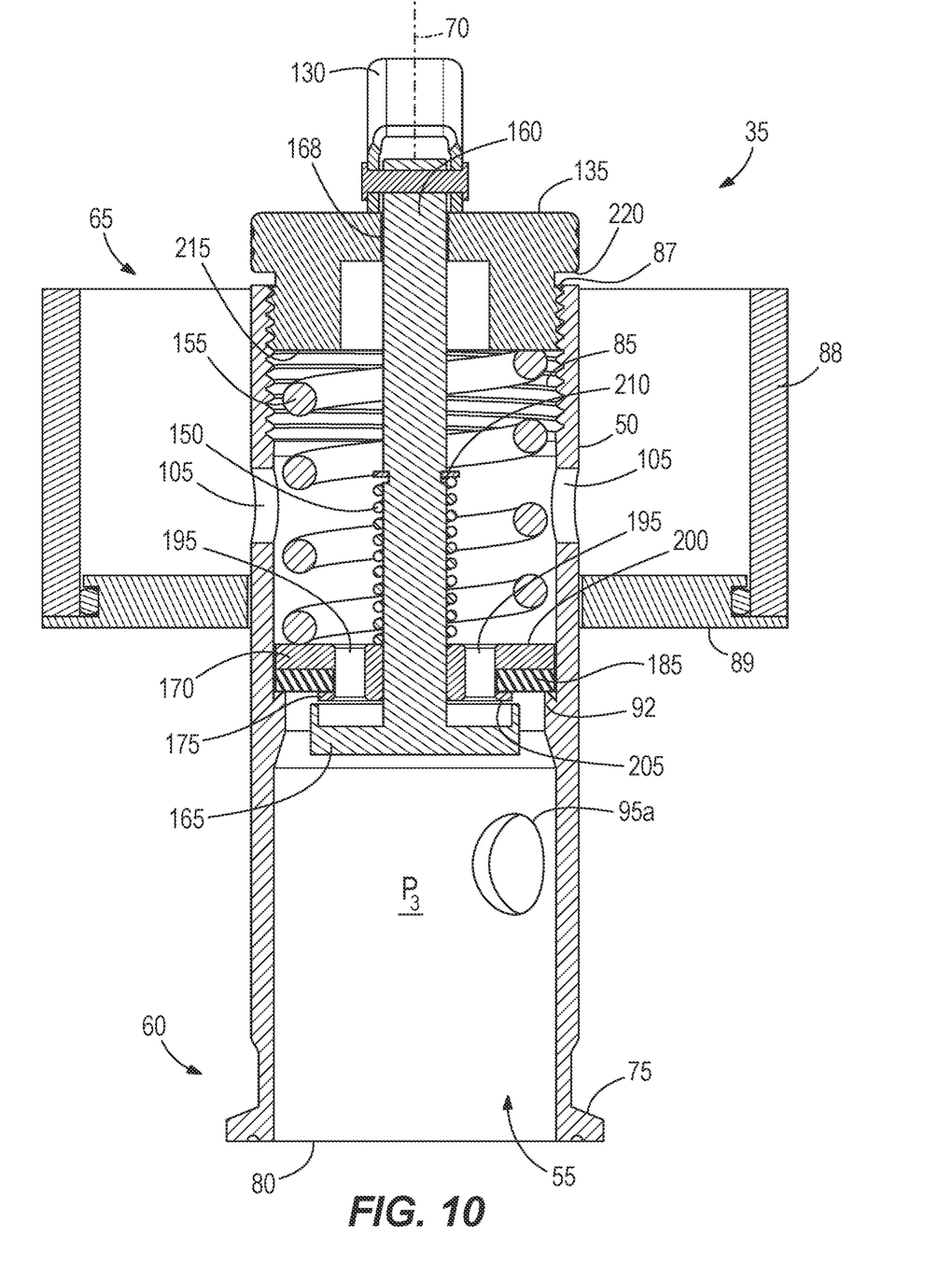
FIG. 10 is a cross sectional view of the pressure valve of FIG. 2, illustrating the pressure valve in a vacuum release position.
Figure 11:
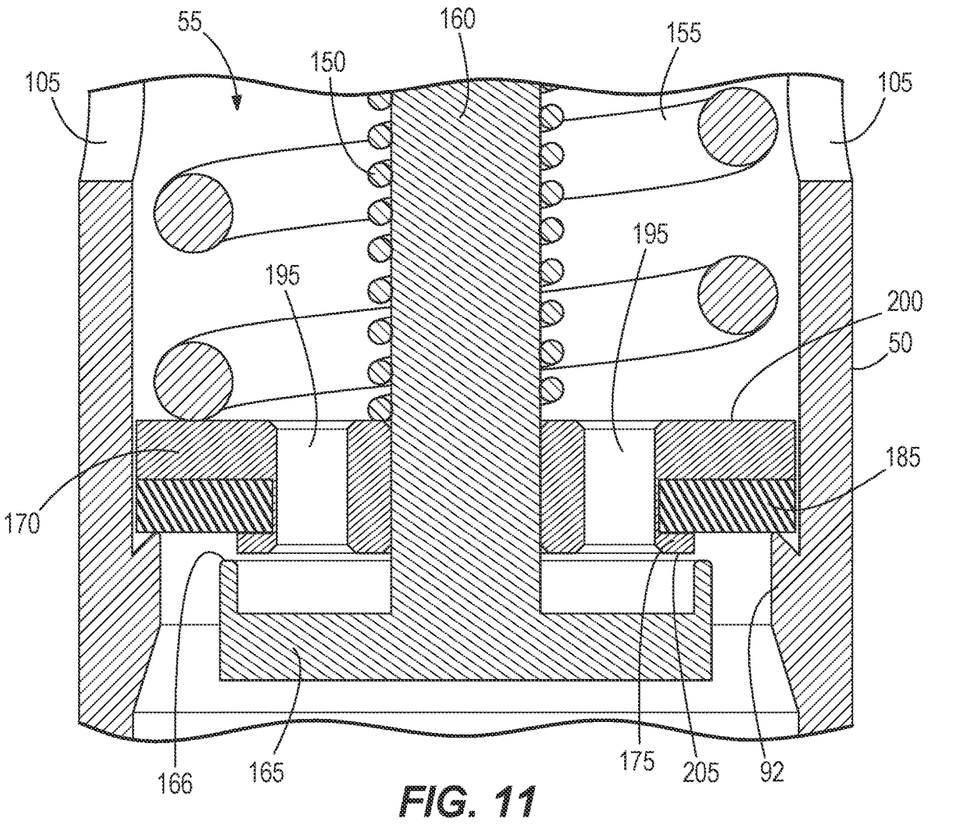
FIG. 11 is a detailed view of a portion of the pressure valve of FIG. 10.

With reference to FIGS. 10 and 11, the illustrated pressure valve 35 is also operable as a vacuum release valve. The fermenter 10 can experience a negative pressure environment or vacuum during the fermentation process (e.g., when the material within the fermenter 10 is cooled, also known as cold crashing). In particular, a negative pressure $P_3$ within the fermenter 10 acts to pull downwardly on the plunger 140 against the biasing force of the first biasing member 150. Such movement of the plunger 140 breaks the seal between the upper rim 166 of the bowl 165 and the seal 185 allowing ambient air to enter the fermenter 10 through the pressure valve 35 (e.g., if the inert liquid was removed from the container 88 during cold crashing). Specifically, ambient air can travel through the vent apertures 105 of the housing 50, the vent passageways 195 of the disk 145, the bowl 165 of the plunger 140, and through the bottom opening 80 of the housing 50. In the illustrated embodiment, the negative pressure $P_3$ is between 1 psi and 5 psi below atmospheric pressure before the airtight seal between the bowl 165 and the seal 185 is broken. In other embodiments, the inert liquid remains within the container 88 during cold crashing and/or pressure is added to the fermenter 10 via the gas inlet post 120 during cold crashing. In further embodiments, the outlet 93 can be opened to drain the inert liquid from the container 88 before cold crashing. In yet further embodiments, the shaft 160 of the plunger assembly 125 can be shortened. More specifically, a length of the shaft 160 can be shortened relative to the length that is shown in FIG. 6. The length of the shaft 160 can be shortened such that at least a portion of the upper portion 170 of the disk 145 extends above (or is coextensive with) the bottom edges of the vent apertures 105 in response to the positive pressure $P_1$ within the fermenter (FIG. 6). In addition, the ledge 92 can also be moved upwardly closer to the vent apertures 105 to maintain the thickness of the disk 145 and the seal 185. Accordingly, when the outlet 93 is opened to drain the container 88, most of the inert liquid is drained from the pressure valve 35 through the outlet 93 and a small amount of the inert liquid is left within the housing 50 (e.g., within the bowl 165 and the vent passageways 195).

Furthermore, such movement of the plunger 140 in the downward direction against the biasing force of the first biasing member 150 can be a manual operation to release positive pressure from the fermenter 10. Manually pushing down on the plunger 140 can provide smaller adjustments of releasing positive pressure from the fermenter 10 than manually moving the actuator 130. For example, the end of the shaft 160 coupled to the actuator 130 can be pressed downwardly toward the cover 135 against the biasing force of the first biasing member 150. In particular, the downward force can be applied to the end of the shaft 160 in a direction along the longitudinal axis 70, without rotation of the actuator 130 or the cover 135. As a result, the upper rim 166 of the bowl 165 breaks the airtight seal between the bowl 165 and the seal 185 thereby allowing positive pressure to escape from the fermenter 10 through the vent passageways 195.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A pressure valve configured to be selectively coupled to a vessel, the pressure valve comprising:
    a housing defining an internal cavity, a bottom portion defining a bottom opening of the internal cavity, a top portion opposite the bottom portion, and an outer surface between the top and bottom portion, the housing including
        a vent aperture defined by the outer surface and configured to provide fluid communication between the internal cavity and ambient air surrounding the pressure valve,
        an accessory aperture defined by the outer surface and configured to couple an accessory to the housing, and
        a seal seat positioned within the internal cavity fluidly between the vent aperture and the accessory aperture; and
    a pressure control assembly coupled to the housing, the pressure control assembly including
        an actuator,
        a shaft coupled to the actuator, the shaft including an end portion, and
        a seal selectively engageable with the seal seat of the housing, the seal also selectively engageable with the end portion of the shaft,
    wherein the seal is configured to break a sealing engagement with the seal seat to provide fluid communication between the vessel and the vent aperture in response to a desired positive pressure being reached within the vessel,
    wherein the seal is configured to break the sealing engagement with the seal seat to provide fluid communication between the vessel and the vent aperture in response to an operator moving the actuator,
    wherein the end portion of the shaft is configured to break a sealing engagement with the seal to provide fluid communication between the vessel and the vent aperture in response to a negative pressure being reached within the vessel, and wherein the end portion of the shaft is configured to break the sealing engagement with the seal to provide fluid communication between the vessel and the vent aperture in response to the operator moving the end portion of the shaft relative to the seal.

2. The pressure valve of claim 1, wherein the pressure control assembly includes a first biasing member that biases the seal into engagement with the seal seat, wherein the first biasing member is configured to allow the seal to break the sealing engagement with the seal seat in response to the desired positive pressure being reached within the vessel, and wherein the first biasing member is configured to allow the seal to break the sealing engagement with the seal seat by the end portion of the shaft moving the seal relative to the seal seat in response to the operator moving the actuator.

3. The pressure valve of claim 2, wherein the pressure valve assembly includes a cover coupled to the housing, wherein the first biasing member is engageable with the cover, and wherein the pressure valve is configured to selectively change the desired positive pressure within the vessel in response to movement of the cover relative to the housing.

4. The pressure valve of claim 3, wherein the pressure control assembly includes a second biasing member that biases the end portion of the shaft into engagement with the seal, wherein the second biasing member is configured to allow the end portion of the shaft to break the sealing engagement with seal in response to the negative pressure being reached within the vessel, and wherein the second biasing member is configured to allow the end portion of the shaft to break the sealing engagement with the seal in response to the operator moving the end portion of the shaft relative to the seal.

5. The pressure valve of claim 4, wherein the pressure control assembly includes a disk slidably coupled to the shaft, wherein the disk is biased away from the cover by the first biasing member, wherein the end portion of the shaft is biased toward the disk by the second biasing member, and wherein the disk includes a vent passageway configured to provide fluid communication between the vent aperture and the vessel when the end portion of the shaft breaks the sealing engagement with the seal.

6. The pressure valve of claim 1, wherein the accessory is one of a pressure gauge or a gas inlet post to the housing.

7. The pressure valve of claim 1, further comprising a container coupled to the housing such that the vent aperture is positioned within the container, wherein the container includes an outlet, and wherein the outlet is configured to allow a liquid to be drained from the container.

8. The pressure valve of claim 1, wherein the pressure valve is configured to be selectively coupled to a fermentation vessel.

9. A pressure valve configured to be selectively coupled to a vessel, the pressure valve comprising:
   a housing including a sidewall defining an internal cavity and a bottom opening, the housing including
      a vent aperture defined in the sidewall and configured to provide fluid communication between the internal cavity and ambient air surrounding the pressure valve,
      an accessory aperture defined in the sidewall and configured to couple an accessory to the housing, and
      a seal seat positioned within the internal cavity fluidly between the vent aperture and the accessory aperture; and
   a pressure control assembly coupled to the housing, the pressure control assembly including a seal configured to break a sealing engagement with the seal seat to provide fluid communication between the vessel and the vent aperture in response to a desired positive pressure being reached within the vessel, the seal configured to break the sealing engagement with the seal seat to provide fluid communication between the vessel and the vent aperture in response to an operator moving an actuator of the pressure control assembly.

10. The pressure valve of claim 9, wherein the pressure control assembly includes a biasing member that biases the seal into engagement with the seal seat, wherein the biasing member is configured to allow the seal to break the sealing engagement with the seal seat in response to the desired positive pressure being reached within the vessel, and wherein the biasing member is configured to allow the seal to break the sealing engagement with the seal seat in response to the operator moving the actuator.

11. The pressure valve of claim 10, wherein the pressure valve assembly includes a cover coupled to the housing, wherein the biasing member is engageable with the cover, and wherein the pressure valve is configured to selectively change the desired positive pressure within the vessel in response to movement of the cover relative to the housing.

12. The pressure valve of claim 9, further comprising a container coupled to the sidewall of the housing, wherein the vent aperture is positioned within the container.

13. A pressure valve configured to be selectively coupled to a vessel, the pressure valve comprising:
   a housing including a sidewall defining an internal cavity and a bottom opening, the housing including
      a vent aperture defined in the sidewall and configured to provide fluid communication between the internal cavity and ambient air surrounding the pressure valve, and
      a seal seat positioned within the internal cavity such that the seal seat is configured to be fluidly between the vent aperture and the vessel;
   a container coupled to the housing proximate the vent aperture, the container configured to hold a liquid that is in fluid communication with the vent aperture, and
   a pressure control assembly coupled to the housing, the pressure control assembly including a seal selectively engageable with the seal seat, the pressure control assembly including a shaft having end portion selectively engageable with the seal, the end portion of the shaft configured to break a sealing engagement with the seal to provide fluid communication between the vessel and the vent aperture in response to a negative pressure being reached within the vessel, the end portion of the shaft configured to break the sealing engagement with the seal to provide fluid communication between the vessel and the vent aperture in response to the operator moving the shaft relative to the housing.

14. The pressure valve of claim 13, wherein the pressure control assembly includes a biasing member that biases the end portion of the shaft into engagement with the seal, wherein the biasing member is configured to allow the end portion of the shaft to break the sealing engagement with seal in response to the negative pressure being reached within the vessel, and wherein the biasing member is configured to allow the end portion of the shaft to break the sealing engagement with the seal in response to the operator moving the shaft relative to the housing.

15. The pressure valve of claim 14, wherein the pressure control assembly includes a disk slidably coupled to the shaft, wherein the seal is coupled to the disk, wherein the end portion of the shaft is biased toward the disk by the biasing member, and wherein the disk includes a vent passageway configured to provide fluid communication between the vent aperture and the vessel when the end portion of the shaft breaks the sealing engagement with the seal.

16. The pressure valve of claim 13, wherein the housing includes an accessory aperture defined in the sidewall vertically offset from the vent aperture, wherein an accessory is coupled to the accessory aperture, and wherein the accessory is a pressure gauge or a gas inlet post.

17. The pressure valve of claim 13, wherein the container includes an outlet, and wherein the outlet is configured to allow the liquid to be drained from the container.

18. The pressure valve of claim 9, wherein the vent aperture is vertically offset from the accessory aperture on the sidewall of the housing.

19. The pressure valve of claim 9, wherein the accessory aperture is a first accessory aperture configured to couple a first accessory to the housing, and wherein the housing includes a second accessory aperture defined in the sidewall and configured couple a second accessory to the housing.

20. The pressure valve of claim 19, wherein the first accessory is a pressure gauge and the second accessory is a gas inlet post.

* * * * *